March 31, 1931.  F. H. SCHWERIN  1,798,955
POLE SNUBBING DEVICE
Filed Dec. 24, 1927   3 Sheets-Sheet 1

INVENTOR
Frank H. Schwerin
BY
ATTORNEY

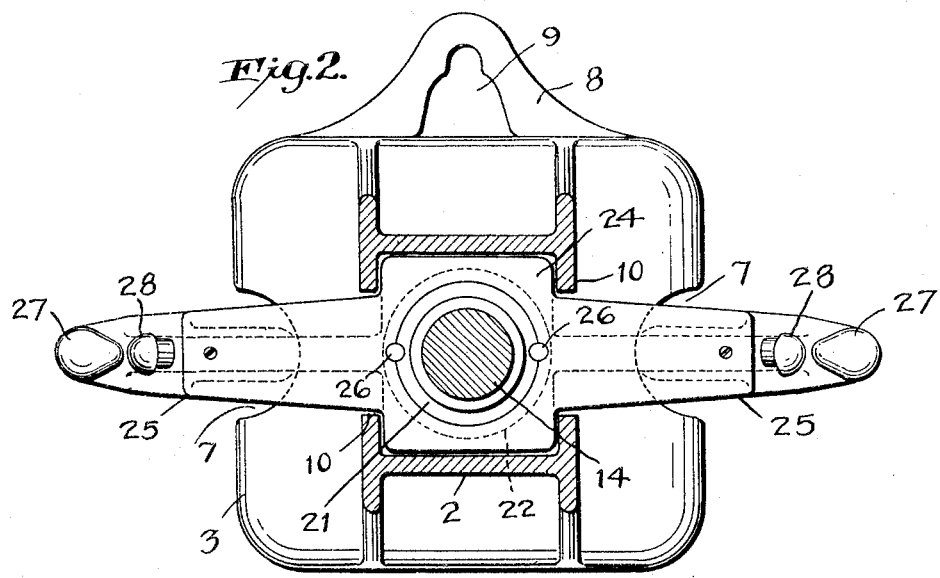
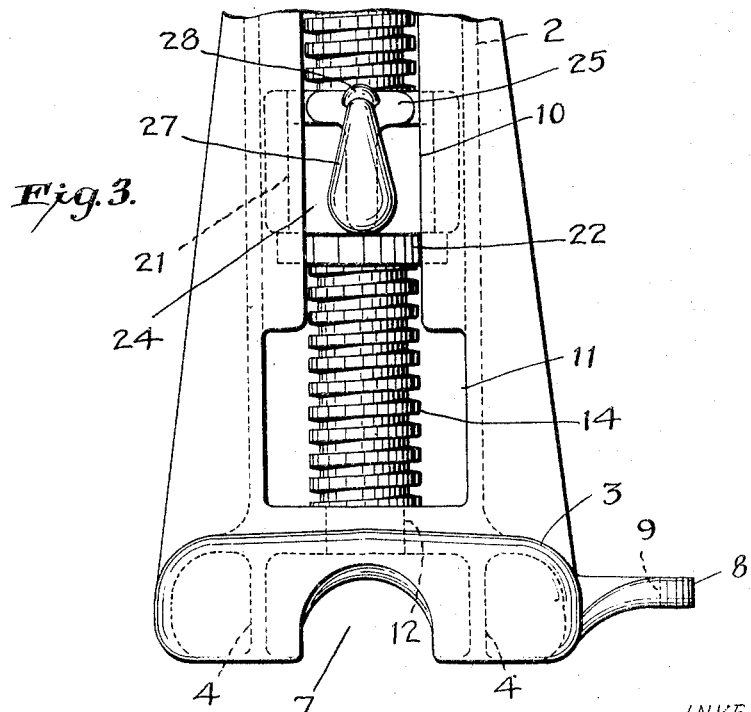

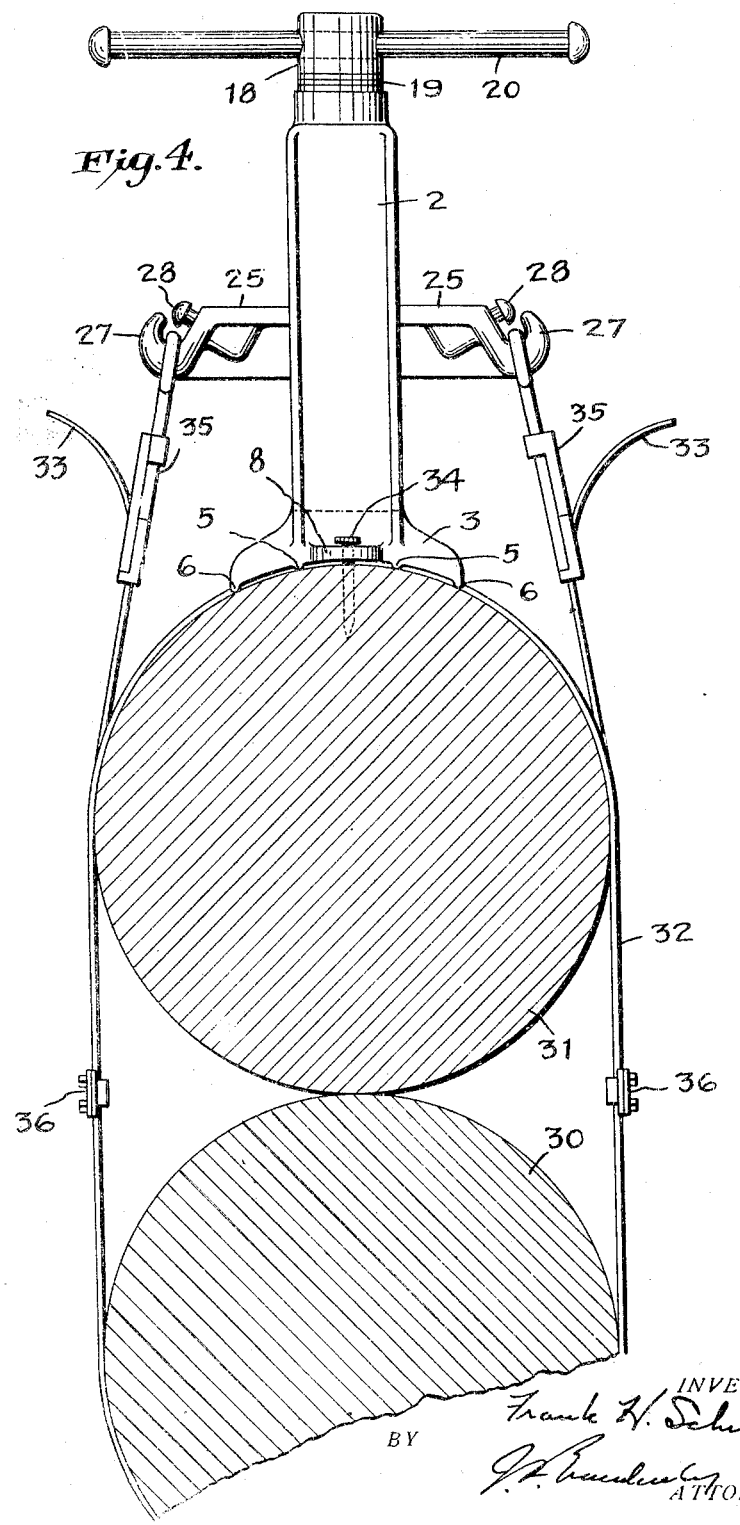

Patented Mar. 31, 1931

1,798,955

UNITED STATES PATENT OFFICE

FRANK H. SCHWERIN, OF BELLEVUE, PENNSYLVANIA, ASSIGNOR TO THE DUFF-NORTON MANUFACTURING COMPANY, OF PITTSBURGH, PENNSYLVANIA, A CORPORATION OF PENNSYLVANIA

POLE-SNUBBING DEVICE

Application filed December 24, 1927. Serial No. 242,492.

The object of the invention is to provide a simple strong, convenient and effective screw device for use in pole snubbing or the binding of poles together. A further object is to provide a device of this character which is adapted to be supported and kept in position projecting horizontally from a pole without manual or extraneous support.

The device comprises an elongated frame having a base adapted to fit the curvature of a pole and provided with a suspension bracket, a screw shaft rotatably mounted at its opposite ends in the frame, operating means connected with the outer end of said shaft, a non-rotary nut traveler on the screw shaft, a yoke having arms projecting oppositely from the nut traveler through longitudinal slots in the sides of the frame, and hooks on the ends of said arms to receive grips holding the ends of a cable which is passed about the poles. These and other features of the invention will become apparent as the specification proceeds, and will be more particularly pointed out in the claims.

In the accompanying drawings, forming part hereof:

Fig. 2 is a cross-section on the line 2—2 of Fig. 1;

Fig. 3 is an elevation of approximately the inner half of the device, the remainder being broken away, this view looking at right angles to Fig. 1; and Fig. 4 is a plan view of the device in use, showing the cable passing about two poles, which are represented in section, and grips and clamps which are used in connection with the operation.

Figure 1:
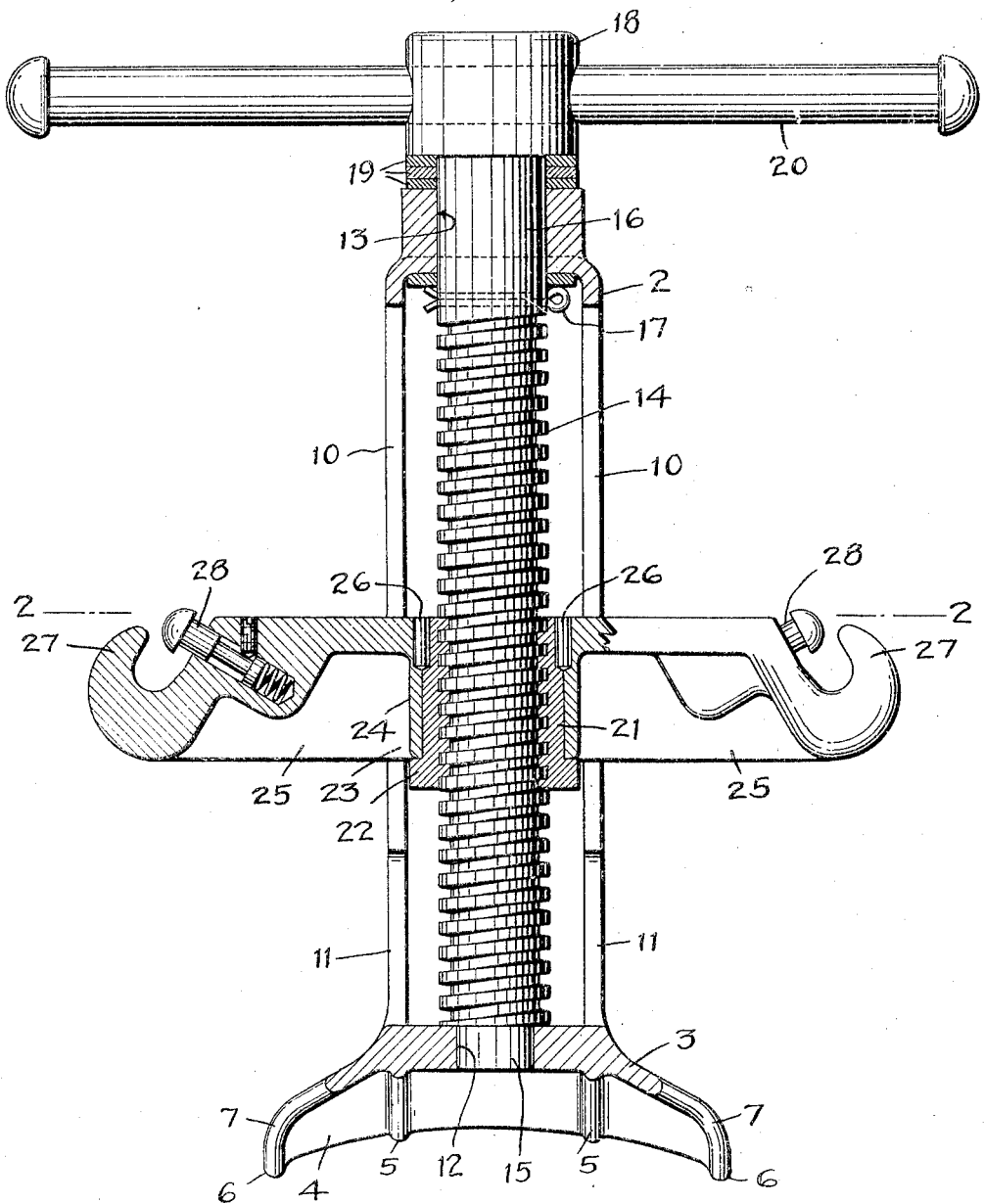
Fig. 1 is a longitudinal section through the device, with parts in elevation.

The work for which the device is more particularly designed is the drawing and binding together of two poles, or one pole to another pole already standing in the ground.

The device comprises a strong, hollow, elongated frame 2 of approximately square section. At one end this frame has an integral enlarged base 3, which is arched and generally incurved at the under side so as to conform to the side of a pole, when applied thereto, as illustrated in Fig. 4. The base is strengthened beneath by ribs 4 and 5 running in two directions, the ribs 5 and the edges 6 of the base at the ends of the curve projecting somewhat so as to form a number of points or lines of contact with the side of the pole.

The sides of the base terminating in the edges 6 have central notches 7 formed therein for a purpose which will appear. One of the edges of the base has a projecting flange 8 formed with a key-hole opening 9, the purpose of which, also, will appear. Two opposite sides of the frame have longitudinal slots 10 extending from the outer end portion of the frame to points adjacent the base, where they communicate with enlarged openings 11 in the same sides.

In the center of the base there is a bearing opening 12, and in the outer end of the frame there is another bearing opening 13. A screw-shaft 14 has unthreaded journal portions 15 and 16 at the opposite ends of its screw-threaded portion. This shaft is inserted into the frame through the opening 13, its journal portion 15 engaging the bearing 12 and its journal portion 16 occupying the opening 13. A cotter pin 17 passed through a transverse opening in the shaft inwardly of the outer end of the frame holds the screw against coming out. The portion of the shaft which projects outwardly of the end of the frame is provided with a head 18, between which and the frame there is a thrust-bearing preferably comprising washers 19. A handle rod 20 is passed through a cross opening in the head of the screw for operation.

A traveler nut 21 is disposed within the frame on the screw 14, this nut having a flange 22 at its inner end. A yoke 23 is formed with a central portion 24 fitting the nut and with oppositely extending arms 25, which latter project outward through the slots 10 to a distance at each side of the frame. The central portion 24 of the yoke has an opening whereby it fits around the nut and against the flange 22, and the nut and yoke are united together by pins 26. The said central portion of the yoke is approximately rectangular in form, substantially filling the cross-section of the interior of the frame, wherein it is non-rotatably guided, the nut being also held from turning by reason of being united to the yoke.

The outer ends of the arms 25 are formed with hooks 27, provided with spring-pressed snap pins 28.

In assembling the device, the yoke and nut are adapted to be introduced into the frame through the enlarged openings 11, after which the screw is inserted through the outer end of the frame and screwed through the nut into its proper position in the frame.

A mode of using the device is illustrated in Fig. 4, wherein 30 may be a standing pole and 31 a pole to be bound to it. A wire cable 32 is passed twice around the two poles, with its ends 33 at the same side of the pole 31. A nail 34 is driven into the pole 31 and the device is hung from this nail by means of the eyelet flange 8. The notches 7 in the edges 6 of the base of the flange enable the base to straddle the courses of the cable which pass about the outer side of the pole 31. A pair of wire grips 35 are applied to the hook ends of the arms 25. These grips are known devices for gripping wire and need not be particularly illustrated. They may remain connected with the arms, and held against unintended disconnection by the snaps 28. The ends of the cable are inserted in the grips, and the handle 20 is then operated to turn the screw shaft and draw the yoke away from the pole. By this action the cable is pulled tight around the poles, and the pole 31 is forced close against the pole 30. When this has been accomplished clamps 36 are affixed to the two courses of the cable at opposite sides of the pole, completing the fastening. The grips 35 are then disengaged from the ends of the cable, and the excess cable ends may be cut off.

The device requires no support or holding, manual or otherwise, other than the engagement of the eyelet bracket with the nail driven into the pole and the bearing of the base over the curvature of the pole. When the pole snubber is placed in this manner and the two ends of the cable have been connected with the arms, all that the operator has to do is to operate the bar 20 to turn the screw, and he has both hands free for this purpose.

The device may be varied in details, and it may be used for other kindred purposes.

I claim:

1. A pole-snubbing device, comprising an elongated hollow frame having a base adapted to be applied to the side of a pole, said base having a shaft bearing and the outer end of the frame having an opening, opposite sides of the frame having longitudinal slots with enlarged openings at the inner ends of said slots, and a yoke having a nut in its central portion and oppositely extending arms provided at their ends with means for connection with the ends of a cable, said yoke and nut being adapted to be introduced into the frame through said enlarged openings and the arms being adapted to travel in said slots, a screw shaft rotatably mounted at its opposite ends in said bearing and in the opening in the outer end of the frame, said shaft being adapted to be inserted into the frame through said outer opening into engagement with said nut, a head on said shaft, and operating means connected with the outer portion of said shaft.

2. A pole-snubbing device having, in combination, a frame provided with a base formed to bear against the curvature of a pole, a screw in said frame, a nut traveler on the screw, cable connections carried by said traveler at opposite sides of the screw, and means for suspending the device from the pole by its base, whereby the pole-snubbing device is supported and kept in position on the pole without manual or extraneous support.

3. A pole-snubbing device, comprising a frame, a screw shaft journaled in said frame and provided with operating means at the outer end, a non-rotary nut traveler on the screw, two oppositely extending arms on said traveler projecting outwardly from the frame and having hooks at their ends to receive cable grips, a base formed at the inner end of the frame to bear against the curvature of a pole and to straddle a cable wrapped about the pole, and means on the base for hanging it on a nail driven into the pole, whereby the device is supported and kept in position on the pole without manual or extraneous support.

FRANK H. SCHWERIN.